United States Patent [19]

Veazey

[11] Patent Number: 4,694,059
[45] Date of Patent: Sep. 15, 1987

[54] POLYALLOOCIMENE AND METHOD FOR THE PREPARATION THEREOF

[75] Inventor: Richard L. Veazey, East Windsor, N.J.

[73] Assignee: Union Camp Corporation, Wayne, N.J.

[21] Appl. No.: 919,844

[22] Filed: Oct. 16, 1986

Related U.S. Application Data

[63] Continuation-in-part of Ser. No. 801,899, Nov. 26, 1985, abandoned.

[51] Int. Cl.$^4$ ............................................. C08F 36/22
[52] U.S. Cl. ............................... 526/340.3; 526/173; 526/181; 526/191
[58] Field of Search ..................... 526/336, 340.3, 173, 526/181, 191

[56]         References Cited
       U.S. PATENT DOCUMENTS 2,351,786   6/1944   Rummelsburg ...................... 526/336
2,383,084   8/1945   Rummelsburg ...................... 526/336

OTHER PUBLICATIONS

J. Amer. Chem. Soc., 81, pp. 4694–4697, 1959, C. S. Marvel.
Tetrahedron, 27, pp. 653–662, 1971.
Chemical Abstracts 95:116053k.

Primary Examiner—Paul R. Michl
Attorney, Agent, or Firm—Edward J. Sites

[57]         ABSTRACT

A novel class of alloocimene polymers have been prepared which are comprised of a mixture of polymer chain units of 2,3-alloocimene and 6,7-alloocimene. The novel polyalloocimenes of this invention are prepared by polymerizing alloocimene in a reaction mixture which contains a catalyst system comprised of a metal such as sodium and an aliphatic or cycloaliphatic ether such as 1,2-dimethoxyethane. The polyalloocimenes of this invention have a majority of the residual unsaturation present in pendent dimethylbutadienyl groups. The polyalloocimenes of this invention are useful in of themselves as film forming binders for inks, as tackifiers for hot melt adhesive and the like. The polyalloocimenes of this invention are also especially useful as intermediates. The presence of the substantial amount of unsaturation and particularly the conjugated unsaturation of the pendent groups make the polyalloocimenes of this invention exceptionally reactive. For example Diels-Alder adducts of the polyalloocimene of this invention and an activated olefin can readily be prepared. The adducts which are formed are useful as binder resins in printer ink, coating and adhesive formulations.

22 Claims, 2 Drawing Figures

POLYALLOOCIMENE AND METHOD FOR THE PREPARATION THEREOF

CROSS-REFERENCE TO RELATED APPLICATION

This application is a continuation-in-part of pending U.S. Patent Application Ser. No. 801,899, filed Nov. 26, 1985, now abandoned.

This invention relates to a novel class of polyalloocimenes and to the method to the preparation thereof. More particularly this invention is concerned with a method for the regioselective polymerization of alloocimene to form alloocimene polymers having a majority of the residual unsaturation present in pendent conjugated dienyl groups.

BRIEF DESCRIPTION OF THE PRIOR ART

Polymerization of alloocimene (2,6-dimethyl-2,4,6-octatriene), has been known since 1941. U.S. Pat. No. 2,351,786 disclosed the preparation of viscous oils, useful in coatings, textile finishing compositions, and adhesives, by treating linear terpene trienes with substantially anhydrous hydrogen fluoride. U.S. Pat. No. 2,373,419, disclosed as a process improvement, the use of transition metal halides as catalysts in an inert solvent. The cationic polymerization reported in this patent was, nevertheless, accompanied by the formation of a substantial amount of undesirable, low molecular weight oligomers. Additionally, representative of the prior art, is also U.S. Pat. No. 2,383,084, which disclosed the preparation of copolymers of alloocimene and aromatic compounds in the presence of acid, clay, and transition metal catalysts.

C. S. Marvel, P. E. Kiener, and E. D. Vessel [J. Amer. Chem. Soc., 81,4694 (1959)] reported polymerizing alloocimene to a linear polymer with a triisobutylaluminum-titanium tetrachloride catalyst. They initially assigned a 6,7-linkage to 40–50% of the polymer, and a 4,7-linkage to the remaining 50–60%. However when Marvel and Kiener [J. of Polym. Sci. 61 311 (1962)] did a more thorough investigation into the polymerization of alloocimene with different catalysts to establish structures, they showed that Ziegler-Natta catalysts and acidic catalysts all gave polymers which contained only 20–40% of conjugated double bond structures. No prior art process or catalyst gave a single, regioregular polymer structure, nor a polyalloocimene containing a majority of pendant conjugated diene groups.

In preparing pure alloocimene, Marvel and co-workers treated alloocimene feed with metallic sodium, and distilled alloocimene over sodium. They reported no polymer formation during such treatment. Yet metal-catalyzed polymerizations conjugated dienes are documented. U. S. Pat. Nos. 1,058,056 and 1,073,116, described elastomeric materials prepared by treating butadienes with sodium and other alakali metals in the absence of any co-catalyst. U.S. Pat. No. 1,192,310, described a process to prepare carbon dioxide-functionalized polybutadiene polymers. These processes, in which neat olefins were exposed to a metal catalyst, were slow, usually requiring several days reaction time, and gave very viscous products.

These problems were overcome by the use of solvents to disperse the metal catalyst and to favorably influence the rate and course of the reaction. Representative of this art are U.S. Pat. Nos. 1,827,285 and 1,880,918. U.S. Pat. No. 1,885,653 claimed similar advantages for the use of inorganic diluents, for example, sodium chloride.

More contemporary anionic polymerization processes have focused on processes to regioselectively polymerize the butadiene families of diolefins, in which most of the monomers were linked in a 1,2 or 1,4 fashion. Representative of this art are U.S. Pat. Nos. 3,035,056, 3,306,949 and 3,488,332. These patents taught the polymerization of conjugated dienes of up to ten carbon atoms in polar, non-reactive solvents, especially ethers. Catalysts were alkali metals alone, as dispersions, or in the presence of A Lewis base and/or an aryl compound, for example, naphthalene.

The presence of polar solvents or additives does not automatically imply either 1,2 or 1,4-addition polymerization. The process claimed in U.S. Pat. No. 3,306,949 gave a polymer with increased 1,2-linkages. On the other hand, U.S. Pat. No. 3,734,972 claimed in improved multifunctional polymerization initiator for conjugated dienes, prepared from organolithium reagents and polar compounds such as alkali metal alkoxides, secondary amines, tertiary amines, and phosphoramides which gave cis-1,4 linkages in the polymer products.

As discussed above, prior art alloocimene polymerizations utilizing acidic catalysts, proceed in a largely regio-random fashion, and little latitude exists when utilizing these catalysts to alter the type of linkages in the product polymer. Further, the prior art polymerizations are invariably accompanied by formation of significant amounts of undesirable low molecular weight by-products. Reaction of alloocimene with anionic catalysts are also known. David and Kergomark [Tetrahedron, 27 653 (1971)]and Daupin [Bull. Soc. Chim Fr. (Part II), 1210 (1975)]reported that alloocimene treated with sodium in polar solvents at 25° C. undergoes anionic cyclization to cycloheptadiene derivatives and reduction to dihydroalloocimene, but not polymerization.

SUMMARY OF THE INVENTION

A novel class of alloocimene polymers have been prepared which are comprised of a mixture of polymer chain units of 2,3-alloocimene and 6,7-alloocimene. The novel polyallocimenes are prepared by polymerizing alloocimene in a reaction mixture which contains a catalyst system comprised of a metal such as sodium and an ether such as 1,2 dimethyoxyethane. The resulting polyalloocimenes of this invention are useful in themselves as binders for ink compositions, as tackifiers for a hot melt adhesives, and the like. The polyalloocimenes because of their low ceiling temperatures and their solvent solubility characteristics are also useful as microlithographic recording resists. The polyalloocimenes of this invention are also especially useful as intermediates. The presence of the substantial amount of unsaturation and particularly the conjugated unsaturation of the pendent groups make the polyalloocimenes of this invention exceptionally reactive. For example Diels-Alder adducts of the polyalloocimene of this invention and an activated olefin can readily be prepared. The adducts which are formed are useful as binder resins in printer ink, coating and adhesive formulations.

DETAILED DESCRIPTION OF THIS INVENTION

Figure 1:
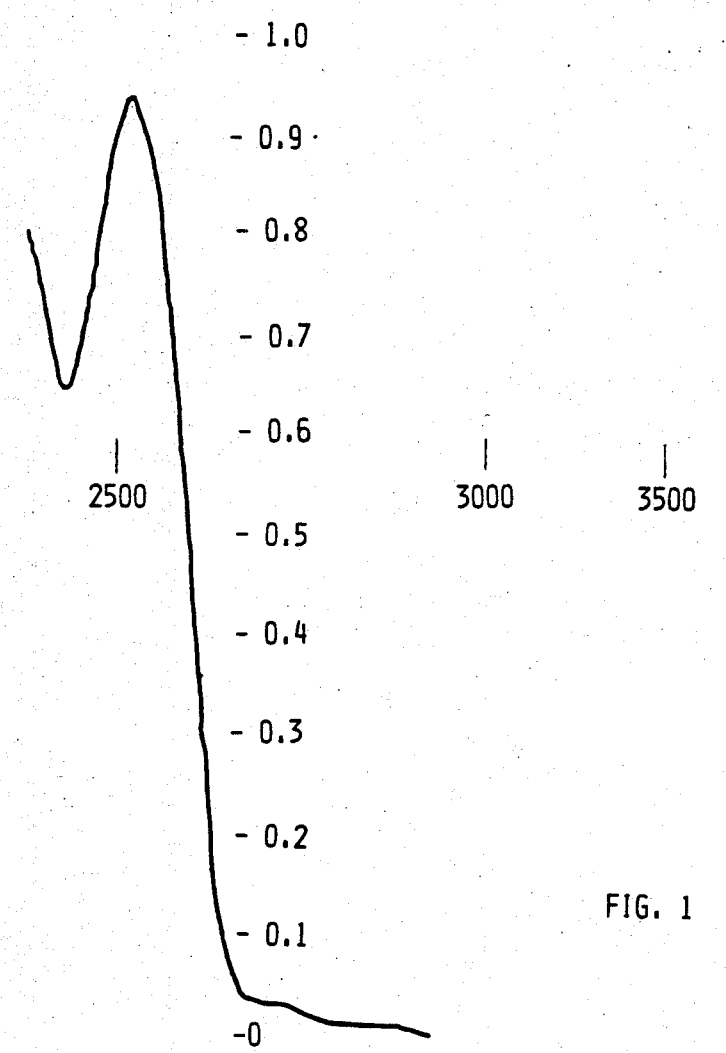
FIG. 1 is a graphic illustration of an ultraviolet absorption spectrum for an alloocimene polymer of this invention.

Alloocimene is the starting reactant used in the preparation of polyalloocimene in accordance with the method of this invention. Alloocimene also known as 2,6-dimethyl-2,4,6-octatriene is represented by the formula.

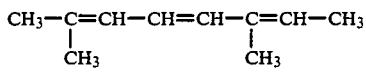

Alloocimene is produced commercially by the thermal isomerization of alpha-pinene which yields a mixture of various reaction products. The alloocimene reaction products which are produced are comprised principally of the isomers known as alloocimene A, [4 trans 6 cis isomer] and alloocimene B, [4 trans 6 trans isomer].

The alloocimene reactant used in the method of this invention can be a purified form of alloocimene comprised of one or more isomeric forms of alloocimene. Crude alloocimene can also be purified prior to addition to the reaction mixture by distilling the alloocimene over sodium by methods that are well known in the art.

It is also possible to employ as the alloocimene source a mixture obtained commercially which contains substantial amounts of other materials such as limonene, and monoterpenes; such as, alpha-pinene, trans-ocimene, cis-ocimene, myrcene and the like. Commercially available mixtures containing alloocimene are generally a less expensive as source of alloocimene than the purified alloocimenes, and as will be explained below, certain additional materials commonly found in the mixtures, such as limonene, can be effective reaction solvents in the polymerization process. In order to obtain satisfactory yields of the desired polymers, it has been found to be preferable when using mixtures of materials as a source of the alloocimene that the mixtures contain at least about 40 per cent by weight of alloocimene in the form of trans, cis alloocimene and trans, trans alloocimene. It is preferable that the alloocimene feed be essentially free of peroxides, water, alcohols, and other oxygenated organic compounds, and even more preferable that the alloocimene feed be treated with a drying agent, for example, calcium hydride, prior to addition to the reaction mixture.

The catalyst system employed to catalyze the regioselective polymerization of the alloocimene in accordance with this invention is comprised of a metal component and an ether component.

The metal catalyst component can be any suitable alkali metal or calcium, or mixtures of the metals, or catalytically effective alloys of the metals. The metals used for the metal component specifically include lithium, sodium, potassium and calcium with the preferred metals being lithium and sodium. The active metal catalyst component should be substantially freed of surface oxides and other contaminants, and be present at a concentration of less than 10 mole percent based on the alloocimene present in the reaction mixture. It is difficult to determine the exact lower limit of metal necessary for polymerization because of the possibility that depending on the impurities present in the reactants, certain amounts of the metal may be consumed in the reaction mixture. The active metal catalyst component can be present in the reaction mixture as wire, foil, a finely divided dispersion or as a solution with an aromatic hydrocarbons, such as naphthalene, 2-methylnaphthalene, and the like.

The ether component of the catalyst system can be an aliphatic ether, an cycloaliphatic ether or a mixture thereof. The ether component is preferably present in the reaction mixture in a amount greater than 5 weight percent of the alloocimene present in the reaction mixture. The most preferable ethers for use in the present invention are tetrahydrofuran and 1,2-dimethoxyethane.

In the polymerization reaction of this invention it should be noted that both the metal component and the ether component of the catalyst systems are required to be present. The polymerization of alloocimene to the desired polyalloocimene of this invention will not occur if for example only the metal is present as is indicated by the use of metalic sodium to purify alloocimene feed stocks.

In addition to the catalyst components, the reaction mixture may also contain nonreactive hydrocarbon solvents and diluents, for example, benzene, toluene, xylene, ethylbenzene, pentane, hexane, cyclohexane, heptane, octane, nonane, limonene, p-cymene, and the like, or mixtures thereof.

The polymerization of the alloocimene is conducted under a protective inert gas atmosphere. The gas which is used should not be easily oxidized and should not react with the metallic component or the organosodium species formed during the polymerization. Preferred gases are substantially pure nitrogen, argon, helium, and mixtures thereof.

In the method of this invention, alloocimene which preferably is substantially anhydrous is added slowly to the reaction mixture comprised of the metal catalyst component disposed in the ether component under an inert gas atmosphere. The reaction is controlled by slow alloocimene addition because the polymerization reaction is highly exothermic. The polymerization reaction is carried out at a temperature from about −78° C. to 100° C. and for a reaction time of from 10 minutes to about 500 hours. Most preferably the polymerization reaction is carried out between about −30° C. to about 65° C., and a reaction times of from about 1 to about 8 hours.

When the polymerization has proceded to the desired end point, a proton source, for example, water, an acid, an alcohol, or mixtures thereof can be added in molar excess based on the moles of the metal catalyst component to terminate the reaction by introducing hydrogen atoms at the terminal ends of the polymer chains.

Alternatively, an electrophilic reagent capable of reaction with the anionic ends of the terminally active polymer, i.e., carbon dioxide, oxygen, formaldehyde, ethylene oxide, propylene oxide, carbon disulfide, other aldehydes, ketones, esters, and the like can be added to terminate the polymerization by introducing a functional group at the ends of the polyalloocimene chains. Examples of such groups are carboxyl groups, hydroxy groups, methylol groups, 1-hydroxyethyl groups, 2-hydroxypropyl groups, dithiocarboxyl groups, secondary alcohol groups, and tertiary alcohol groups.

Following the polymerization, the reaction mixture containing the polyalloocimene is subjected to distillation to remove the ether component, unreacted terpenes, any unreactive solvents and any excess of added termination reagent. Care must be taken not to exceed a temperature of 150° C. during distillation to prevent thermal degradation of the polymer. The polymer is discharged while still molten onto a polytetrafluoroethylene coated glass fabric or other suitable surface and allowed to cool. The cooled polymer is then packaged under a nitrogen atmosphere to protect it from oxidation.

A second polymer isolation procedure which can be used and which is especially useful for higher molecular weight polyalloocimene involves cautious transfer of the terminally active polymer along with the other components of the reaction system into a large excess of a nonsolvent, such as methanol, or the like. The polyalloocimene precipitates as a white solid. Collecting, redissolving, and reprecipitating the polyalloocimene solid several times gives, after final drying, a polyalloocimene free of low molecular weight impurities. The dried, isolated polyalloocimene is then packaged and stored in a nitrogen atmosphere.

It is advantageous to add an antioxidant, such as 2,6-ditert-butyl-4-methylphenol or other antioxidants such as those sold under the trademark Irganox 1010, or Irganox 525 by Ciba-Geigy Corporation or the like, or mixtures thereof, prior to distillation isolation, or in the final reprecipitation solvent to protect the polyalloocimene from oxidizing. The polyalloocimene prepared in accordance with this process of this invention consists essentially of a majority of a mixture of polymer chain units of 2,3-alloocimene and 6,7-alloocimene and a minority amount of polymer chain units of 4,7-alloocimene. The majority of the alloocimene is polymerized in accordance with this invention in a regioselective manner so that the residual unsaturation in the resulting polymer is in the form of pendent, conjugated 3,4-dimethylbutadienyl and 4,4-dimethylbutadienyl groups. More specifically, the polyalloocimenes of this invention are comprised of greater than 50 percent by weight of a mixture of polymer chain units of 2,3-alloocimene and 6,7-alloocimene of the respective formulae

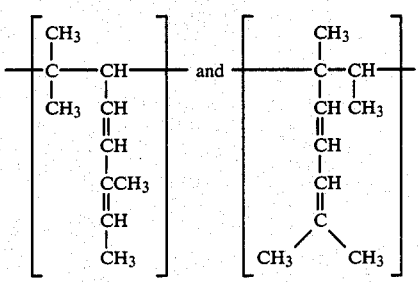

and less than 50 percent by weight of 4,7-alloocimene of the formulae.

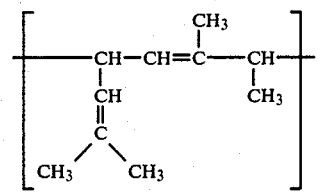

Figure 2:
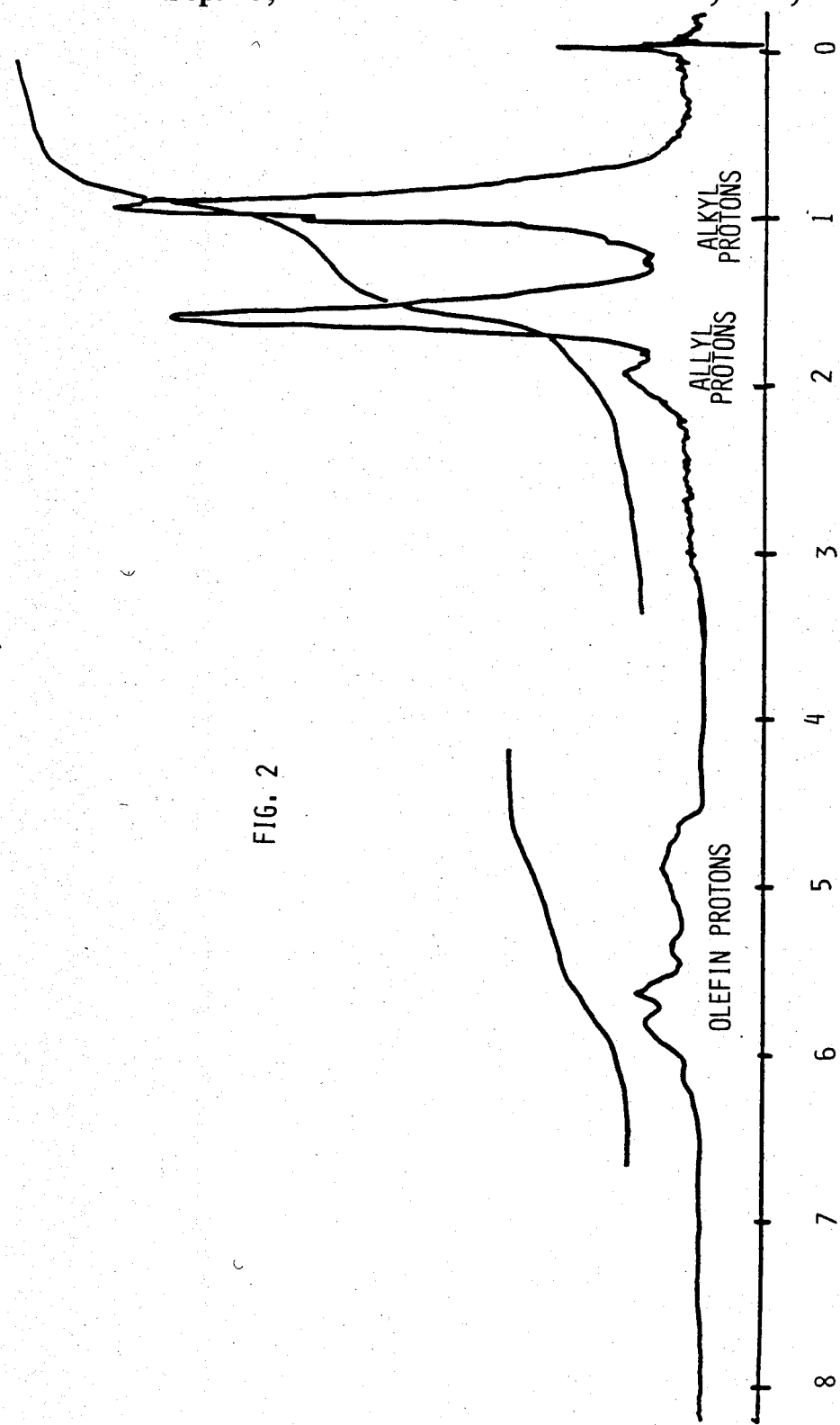
FIG. 2 is a graphic illustration of a nuclear magnetic resonance spectrum for an alloocimene polymer of this invention.

The ultraviolet absorption spectrum shown in FIG. 1 of the polymer is clear evidence of this unique structural arrangement defined above. The ultraviolet absorption spectrum has a prominent $\lambda^{max}$ at 246 m$\mu$ with an extinction coefficient greater than 10,000 which is typical of conjugated olefins. For example, 2,3-dimethyl-1,3-butadiene has $\lambda^{max}$ at 226 and $\epsilon_{max}=21,400$. The nuclear magnetic resonance (NMR) spectrum shown in FIG. 2 supports this structural assignment in that the ratio of protons on methyl groups attached to a double bond (allylic protons) to protons on methyl groups attached to a saturated carbon (alkyl protons) is about 1.0. In contrast, the NMR spectrum of the polyalloocimene from Ziegler-Natta catalyzed polymerization exhibits an allylic:alkyl proton resonance ratio of about 3, which is the ratio expected for structure consisting 4,7-alloocimene polymer chain units, in which none of the residual unsaturation is conjugated.

Further supporting the presence of a preponderance of conjugated diene groups in the repeating unit of this polymer is the ease and extent by which maleic anhydride adds via Diels-Alder reaction to the polyalloocimene of the present invention.

EXAMPLES

The following are set forth to illustrate the present invention, and are not to be deemed to be all-inclusive, or limiting in any manner.

EXAMPLES 1-15

To a clean, over-dried, four neck round-bottom flask, equipped with a thermometer, nitrogen inlet, pressure equalizing addition funnel, a reflux condenser into which was inserted an inert gas exit adapter, and a Nicrome wire stirrer, was added sodium shot and toluene, which had been dried and distilled from calcium hydride. A nitrogen blanket was maintained in the reaction flask at all times. Heat was applied and stirring initiated. The toluene was allowed to gently reflux for 30 minutes, and then it was cooled. At this point either the toluene was removed and replaced by another dry ether or hydrocarbon solvent, another dry solvent was added, or no other solvent was added. A preweighed sample of the alloocimene, which had been dried over calcium hydride and distilled, present either as a relatively pure mixture of trans,trans-alloocimene and trans, cis-alloocimene or a mixture with other monoterpenes, especially limonene, alpha-pinene, cis and trans-ocimene and other methadienes was charged to the addition funnel. The polymerization temperature was maintained by either applying heat or removing it with a dry-ice and isopropanol bath. The heating or cooling rates were maintained with a temperature sensing device. Polymerization was initiated by slowly adding the alloocimene mixture or solution to the stirred solvent containing sodium metal. At the conclusion of the polymerization, the polyalloocimene was isolated by transferring the polymer solution into a separatory funnel containing methanol. After deactivation of the catalyst had occurred, water and ether were added, and the polymer solution was thoroughly washed with water. The organic solution was then dried over anhydrous magnesium sulfate and filtered into a round-bottom flask. The solvent(s) was removed at reduced pressures. Any monoterpenes were isolated at approximately 65° C. and 5 to 10 mm Hg. The distillation was terminated when the temperature in the pot containing the polymer product reached about 150° C. The polymer was poured while hot into a pan, allowed to cool, then stored under nitrogen. Table A lists reaction conditions and polymers prepared in this matter.

TABLE A

| Example No. | Alloocimene Feed Purity (wt %) | Alloocimene Added (true gms) | Amount Sodium (gms) | Amount of Solvent in ml | | POLYMERIZATION Temp. °C. | Time Hrs. | Polymer Yield (gms) |
|---|---|---|---|---|---|---|---|---|
| 1 | 95 | 2.8 | .5 | toluene | 20 | 25 | 336 | — |
| 2 | 95 | 4.9 | 1.0 | toluene | 15 | 25 | 24 | — |
| 3 | 57.4 | 28.6 | 2.8 | THF limonene[b] | 100 25.7 | 61 | 2.5 | 24.3 |
| 4 | 57.4 | 28.7 | 2.8 | THF limonene[b] | 100 25.2 | 60 | 2 | 22.8 |
| 5 | 57.4 | 29.2 | 2.8 | THF limonene[b] | 50 35.2 | 25 | 96 | 27.8 |
| 6 | 57.4 | 25.3 | 3 | THF n-butanol limonene[b] toluene | 30 20 32 100 | 60 | 2.75 | 11.9 |
| 7 | 44.45 | 552.2 | 46 | THF toluene limonene[b] | 252 300 833 | 60 | 4.5 | 402 |
| 8 | 41.5 | 275 | 14.2 | THF toluene limonene[b] | 275 500 466 | 25 | 62 | 287.3 |
| 9 | 44.2 | 27.2 | 2.31 | ether limonene[a] | 100 41.6 | 25 | 168 | 9.44 |
| 10 | 44.2 | 27.2 | 2.46 | 1,8-cineole limonene[b] | 100 41.6 | 25 | 168 | 1.61 |
| 11 | 44.2 | 27.2 | 2.32 | n-heptane limonene[b] | 100 42 | 25 | 168 | 0.86 |
| 12 | 44.2 | 27.2 | 2.32 | 1,2-dimethoxy ethane limonene[b] | 100 42 | 25 | 120 | 25.3 |
| 13 | 44.2 | 27.45 | 2.53 | limonene[b] | 142 | 25 | 24 | 0.54 |
| 14 | 44.2 | 29.97 | 2.32 | triethyl-amine limonene[b] | 90 44 | 25 | 24 | 0.3 |
| 15 | 85.7 | 34.6 | 2.31 | THF limonene[b] | 100 7 | 25 | 48 | 29.6 |

[a]The ingredients in the alloocimene feeds other than alloocimenes A and B were dl-limonene as the major component, and one or more of the following monoterpene components in relatively minor amounts: alpha-pinene, trans-ocimene, cis-ocimene, camphene, myrcene, p-cymene, and other menthadienes.
[b]This is the amount present in the alloocimene feed - no additional limonene was added.

EXAMPLES 16–22

The procedure in Examples 1–15, supra, was repeated a plurality of times, except that the proportion of reactants and/or proportion of solvents and/or the reactants and/or active metal catalysts were changed as set forth in Table B.

TABLE B

| Example No. | Active Metal (gms)[a] | Purity of Alloocimene (Wt. %)[b] | Calculated Amount of Alloocimene of Added in gms | Solvent in ml | POLYMERIZATION Temp. of Reaction °C. | Time in Hrs. | Polymer Yield (g) |
|---|---|---|---|---|---|---|---|
| 16 | Na(2.8) | 57.4 | 29.2 | THF(50) limonene(25.2) | 25 | 96 | 27.8 |
| 17 | K(4.32) | 46.7 | 22.0 | THF(150) limonene(30.4) | 25 | 48 | 14.0 |
| 18 | Li(0.75) | 46.7 | 22.0 | THF(150) limonene(30.4) | 25 | 72 | 15.1 |
| 19 | Li(0.70) | 44.2 | 12.5 | THF(100) | 25 | 3 | 11.3 |
| 20 | Ca(0.4)[c] | 44.2 | 19.1 | THF(100) limonene(28) | 25 | 24 | 1.5 |
| 21 | Mg(4.88)[d] | 44.2 | 27.2 | THF(100) limonene(41.6) | 25 | 62 | 0 |
| 22 | NaH(.3) | 44.2 | 27.0 | THF(100) limonene(32.6) | 25 | 144 | 1.5[e] |
| 23 | (Na)$_x$Hg(.92)[f] | 44.2 | 27.0 | THF(100) | 25 | 120 | 0 |

TABLE B-continued

| Example No. | Active Metal (gms)[a] | Purity of Alloocimene (Wt. %)[b] | Calculated Amount of Alloocimene of Added in gms | Solvent in ml | POLYMERIZATION | | |
|---|---|---|---|---|---|---|---|
| | | | | | Temp. of Reaction °C. | Time in Hrs. | Polymer Yield (g) |
| | | | | limonene(32.6) | | | |

(FOOTNOTES TO TABLE B)
[a] No toluene reflux step prior to adding THF was employed with metals other than sodium.
[b] See Table A for footnote.
[c] The calcium metal was activated with 1.82 g of methyl iodide added prior to the addition of alloocimene.
[d] The magnesium metal was activated with about 30 drops of methyl iodide added to the reaction prior to the addition of alloocimene.
[e] 1.6 g of naphthalene was added after 46 hours of polymerization time.
[f] 0.92 g of sodium in 83.3 g of Hg.

Example 24

The procedure in Examples 1–15, supra was repeated except that 6.41 g of naphthalene were added to the THF and the solution was refluxed (66° C.) under a nitrogen atmosphere about 1.0 hour until the sodium dissolved. The solution was cooled to 25° C. prior to the addition of the crude alloocimene. The data for this example are set forth in Table C.

into the bottle to neutralize the catalyst. The polymer was isolated either by slowly pouring the solution into a large volume of rapidly stirred methanol, dissolving the precipitated polymer into a minimum amount of ether and precipitating the polymer by pouring the ether solution into a second large volume of rapidly stirred methanol continuing a few tenths of a percent of an antioxidant, and repeating this procedure a third time if necessary; or by pouring the polymer solution into ether

TABLE C

| Active Metal (gms) | Purity of Alloocimene Wt. % | Calculated Amount of Alloocimene of Added in gms | Solvent in ml | POLYMERIZATION | | |
|---|---|---|---|---|---|---|
| | | | | Temp. of Reaction °C. | Time in Hrs. | Polymer Yield (gms) |
| Na(1.16) | 44.2 | 27.3 | THF(100) limonene(32.6) | 25 | 24 | 25.83 |

Examples 25 and 26

These polymers were prepared to show that Ziegler-Natta conditions give a different kind of polyalloocimene than do the conditions of Examples 1–24.

To a clean, over dried bottle, which has been allowed to cool to ambient temperatures in a nitrogen atmosphere, was added clean dry stir bar, and a rubber septum was used to seal the bottom in the nitrogen atmosphere. The bottle was removed and placed within a constant temperature bath. Stirring was initiated, and dry solvent added. The aluminum alkyl was added followed by the metal halide or metal oxyhalide. After a predetermined period of time, a predetermined amount of the calcium hydride dried alloocimene feed was added slowly. After a specified time, a predetermined amount of the calcium hydride dried alloocimene feed was added slowly. After a specified time, the polymerization was terminated by injecting sufficient methanol and washing the ether solution with cold dilute aqueous base and water, drying the ether layer over anhydrous magnesium sulfate, and distilling the solvent and monomers at reduced pressure. The polymer was then isolated by pouring it onto a polytetrafluoroethylene-coated sheet to cool or, if it was a liquid, pouring it into a bottle. The date for these examples are set forth in Table D.

TABLE D

| Example Number | Catalysts | Ratio of Metal to Aluminum Compounds | Moles of Metal Halide | Purity of Alloocimene Wt. % | Moles of Alloocimene Added | Solvent and Amount in (ml) | POLYMERIZATION | | |
|---|---|---|---|---|---|---|---|---|---|
| | | | | | | | Temp. of Reaction in °C. | Time In Hours | Polymer Yield in Moles |
| 25 | VOCL Al(i-Bu)₂Cl | .707 | .00150 | 95 | .208 | n-heptane(30) | 0 | 168 | .114 |
| 26 | TiCL₄ (Et)₃Al | .326 | .000456 | 95 | .082 | toluene(18) | −10 −15 | — | — |

The properties of the polyalloocimene polymerized by alkali metals in the presence of ether solvents important for demonstrating that highly conjugated polyalloocimenes were formed are reported in Table E. A comparison is made with the properties of polymers prepared with the Ziegler-Natta catalysts. The polyalloocimenes polymerized by alkali metals had in the proton NMR spectra a ratio of allylic to nonallylic hydrogens of essentially 0.9 to 1.6. In comparison, polyalloocimene polymerized by Ziegler-Natta catalysts had ratios of 2.7 to 3.2.

TABLE E

| | PROPERTIES OF POLY(ALLOOCIMENES) | | | | | |
|---|---|---|---|---|---|---|
| Example Number | GPC No. Average Molecular Wt. | GPC Mw/Mn | Catalyst | Tg °C. | UV Extinction Coefficient at λ = 246 μm | Proton NMR Area % Olefin/Allylic/Alkyl Protons |
| 1 | . | . | Na | +34 | . | 14.7/44.1/41.2 |
| 2 | . | . | Na | +56 | . | 16.7/40/43.3 |
| 3 | . | . | Na | −29 | 13,000 | 14.7/45.6/39.7 |

TABLE E-continued

PROPERTIES OF POLY(ALLOOCIMENES)

| Example Number | GPC No. Average Molecular Wt. | GPC Mw/Mn | Catalyst | Tg °C. | UV Extinction Coefficient at $\lambda = 246$ μm | Proton NMR Area % Olefin/Allylic/Alkyl Protons |
|---|---|---|---|---|---|---|
| 4 | 554 | 1.88 | Na | −34 | 15,000 | 15.2/43.9/40.9 |
| 5 | 1,042 | 2.80 | Na | +1 | . | 16.4/42.6/41 |
| 7 | . | . | Na | −15 | 11,500 | 14.9/49.3/35.8 |
| 8 | 1,400 | 2.93 | Na | +1 | 12,800 | 16.7/51.7/31.7 |
| 9 | 1,467 | 2.85 | Na | −11 | 10,000 | 15.2/43.9/40.9 |
| 12 | 1,308 | 3.74 | Na | +5 | 15,000 | — |
| 15 | 742 | 2.24 | Na | −13 | 16,000 | — |
| 17 | 474 | 1.99 | K | −50 | 14,000 | 15.6/43.8/40.6 |
| 18 | 478 | 1.82 | Li | −46 | 15,000 | 15.2/43.8/43.8 |
| 19 | 1,460 | 3.86 | Li | −8 | 15,000 | 16.4/50.8/32.8 |
| 20 | . | . | Ca | −42 | 10,000 | 10.6/47.9/41.5 |
| 24 | 1,198 | 2.95 | Na/Naphthalene | +3 | 16,000 | . |
| 25 | 9,700 | 2.95 | VOCl$_3$ Al(i-Bu)$_2$Cl | +77 | 5,570 | 12/64/24 |
| 26 | . | . | TiCl$_4$ Et$_3$Al | +34 | 617 | 12/67/21 |

Example 27

To a clean, oven-dried, four neck round-bottomed flask, equipped with a thermometer, nitrogen inlet, pressure equalizing addition funnel, a reflux condenser into which was inserted an inert gas exit adapter, and a Nicrome wire stirrer, was added sodium shot (46 g) and toluene (300 ml) which had been dried and distilled from calcium hydride. A nitrogen blanket was maintained in the reaction flask at all times. Heat was applied and stirring initiated. The toluene was allowed to gently reflux for 30 minutes, and then it was cooled. At this point tetrahydrofuran (250 ml) was added. A preweighed sample of alloocimene (1242 g, 44.5% true) which had been dried over calcium hydride and distilled, was charged to the additional funnel. The polymerization temperature of 60° C. was maintained by applying heat with a heating mantle attached to a temperature sensing device. Polymerization was initiated by slowly adding the alloocimene mixture over one hour to the stirred solvent containing sodium metal. After 4.5 hours, the polymerization was complete and the polyalloocimene was isolated by transferring the polymer solution into a separatory funnel containing methanol. After deactivation of the catalyst, water and toluene were added, and the polymer solution was thoroughly washed with water. The organic solution was then dried over anhydrous magnesium sulfate and filtered into a round-bottom flask. The solvent(s) was removed at reduced pressures. Any monoterpenes were isolated at approximately 65° C. (5 to 20 mm. Hg.). The distillation was terminated when the temperature in the pot containing the polymer product reached about 150° C. The polymer was poured while hot into a pan, allowed to cool, then stored under nitrogen. The polymer yield was 402 g, about 73% of theory. It had a glass transition temperature of −15° C. and a weight average molecular weight of 1480.

The polyalloocimene polymers prepared as described above are useful, for example, as intermediates for adducts prepared by the Diels-Alder reaction of an activated olefin with the polyalloocimene of the invention. The Diels-Alder reaction is well known; see for example Martin and Hill (Chem. Revs., 1961, 61, 537); and Huisgen, The Chemistry of Alkenes, S. Patai, Editor, Chapter II, Part V, p. 878. In general, the reaction comprises the thermal or catalyzed addition of an activated olefin (the dienophile) to conjugated double bonds residing in the 2,3- and 6,7-polyalloocimene.

Example 28

Polyalloocimene prepared by the procedure of Example 27, supra, (10 g, 0.074 moles of terpene units) and maleic anhydride (7.25 g, 0.074 moles) was charged to a reaction flask and heated at 140° C. for 3 hours. A small amount of unreacted maleic anhydride was removed by distillation under vacuum. The product yield was 90% theory. The adduct resin had a glass transition temperature of 66° C., a softening point of 124° to 135° C., and a saponification number of 307 (theory for complete adduction of all terpene units is 481, indicating about 64% adduction efficiency). The infrared spectrum clearly exhibited characteristic anhydride bond vibrations at 1785 and 1860 cm$^{-1}$.

The adduct of Example 8 is useful as a binder component in conventional printing ink, coating and adhesive compositions, when added in a binding proportion.

I claim:

1. A polyalloocimene comprised of a mixture of polymer chain units of 2,3 alloocimene and 6,7 alloocimene.

2. A polyalloocimene comprised of greater than 50 percent by weight of a mixture of polymer chain units of 2,3 alloocimene and 6,7 alloocimene of the respective formulae

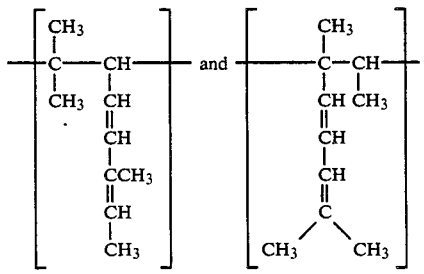

and less than 50 percent by weight of polymer chain units of 4,7 alloocimene of the formula..

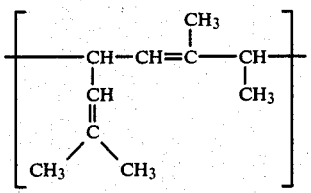

3. A novel polymeric composition of matter comprised of polyalloocimene in which at least about 50 percent of the residual unsaturation is present in pendent, conjugated dimethylbutadienyl groups.

4. A novel polymeric composition of matter, comprised of polyalloocimene having a proton nuclear magnetic resonance spectrum which shows an area in the allylic proton region of greater than 30% but less than 55% of the total proton area and which shows an area in the alkyl absorption region of greater than 30% but less than 45% of the total proton area, having a strong absorption at 965 cm$^{-1}$ in the infrared spectrum and having a ultraviolet spectrum having a absorption maximum around 246 nm plus or minus 5 nm with a molar absorptivity of greater than 10,000.

5. The polymeric composition of matter, comprised of polyalloocimene having a proton nuclear magnetic resonance spectrum which shows an area in the allylic proton region of greater than 30% but less than 55% of the total proton area and which shows an area in the alkyl absorption region of greater than 30% but less than 45% of the total proton area, having substantially comparable absorptions around both 965 and 810 cm$^{-1}$ in the infrared spectrum.

6. The method for the preparation of a polyalloocimene comprised of greater than 50 percent by weight of the polymer chain units of 2,3-alloocimene and 4,7-alloocimene of the respective formulae

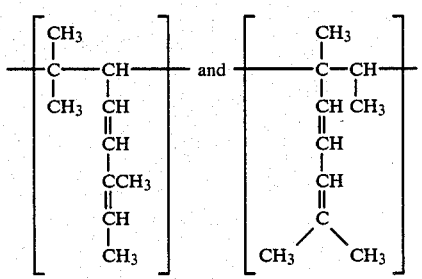

and less than 50 percent by weight of polymer chain unit of 4,7-alloocimene of the formula

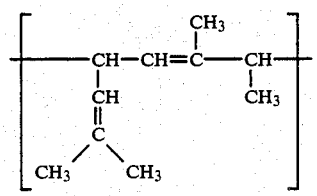

·said method comprising the steps of:
(a) adding alloocimene to a reaction mixture maintained under an inert atmosphere, which includes a polymerization catalyst system comprised of:
(1) a metal selected from the group consisting of lithium, sodium, potassium, calcium and mixtures and alloys thereof.
(2) an ether selected from the group consistng of an aliphatic ether, a cycloaliphatic ethers and mixtures thereof, said metal and said ether being present in said reaction mixture in amounts effective in combination to catalyze the regioselective polymerization of the alloocimene to said polyalloocimene.
(b) maintaining the reaction mixture at a temperature from about $-70°$ to about $100°$ C. for a period of time sufficient for the alloocimene to polymerize to said polyalloocimene of a given degree of polymerization.
(c) and recovering the resulting polyalloocimene from the reaction mixture.

7. The method according to claim 6 wherein the alloocimene is substantially anhydrous when added to the reaction mixture.

8. The method according to claim 6 wherein the alloocimene is added in the form of a mixture containing at least about 40 percent by weight of alloocimene in the form of trans, cis alloocimene and trans, trans alloocimene.

9. The method according to claim 6 wherein the inert atmosphere is selected from the group consisting of nitrogen, argon, helium, and mixtures thereof.

10. The method according to claim 6 wherein the metal is present in an amount greater than 0.001 molar equivalents, but less than about 0.50 molar equivalents based on the amount of alloocimene present in the reaction mixture.

11. The method according to claim 6 wherein the metal is present as a dispersion in the reaction mixture.

12. The method according to claim 6 wherein the metal is present in the reaction mixture as a complex with an aromatic compound.

13. The method according to claim 6 wherein the metal is present in the reaction mixture as a coating on an inert substrate.

14. The method according to claim 6 wherein the alkali metal is sodium.

15. The method according to claim 6 wherein the metal is lithium.

16. The method according to claim 6 wherein the ether is present in the reaction mixture in an amount greater than about 5 percent by weight based on the weight of the alloocimene in the reaction mixture.

17. The method according to claim 6 wherein the ether is selected from the group consisting of 1,2-dimethoxyethane, tetrahydrofuran, diethyl ether, 1,4-dioxane, dimethyl ether, 1,4-cineole and mixtures thereof.

18. The method according to claim 6 wherein the ether is 1,2 dimethyoxyethane.

19. The method according to claim 6 wherein the reaction is conducted at a temperature of from about $-30°$ to about 65° C.

20. The method according to claim 19 wherein the reaction is conducted for from about 2 to 8 hours.

21. The method according to claim 6 wherein the reaction mixture contains a nonreacted hydrocarbon solvent or mixtures thereof.

22. The method according to claim 6 wherein after the dersired degree of polymerization is obtained the polymerization reaction is terminated by the addition of a proton source to the reaction mixture.

* * * * *